(No Model.)

T. C. DILL.
SPOOL SUPPORT.

No. 519,669.  Patented May 8, 1894.

Witnesses:
William A. Barr
Joseph H. Klein

Inventor:
Thomas C. Dill
by his Attorneys
Henson & Henson

THE NATIONAL LITHOGRAPHING COMPANY,
WASHINGTON, D. C.

UNITED STATES PATENT OFFICE.

THOMAS C. DILL, OF PHILADELPHIA, PENNSYLVANIA, ASSIGNOR TO THE DILL SPOOL SUPPORT COMPANY, OF SAME PLACE, AND CAMDEN, NEW JERSEY.

SPOOL-SUPPORT.

SPECIFICATION forming part of Letters Patent No. 519,669, dated May 8, 1894.

Application filed January 5, 1893. Serial No. 457,333. (No model.)

*To all whom it may concern:*

Be it known that I, THOMAS C. DILL, a citizen of the United States, and a resident of Philadelphia, Pennsylvania, have invented certain Improvements in Spool-Supports, of which the following is a specification.

The object of my invention is to prevent the slubbing as it is wound upon a spool, from packing and compressing.

My invention is not only applicable to winding frames and carding engines, but is also applicable to mules or spinning frames where the slubbing is unwound from the spool. Heretofore both in winding the slubbing upon and unwinding it from the spool, the weight of the spool itself was carried by the slubbing on the spool; consequently as the spool increased in size, the weight became greater, and consequently the pressure was such that in many cases when the slubbing was unwound from the spool it would pull apart at frequent intervals causing much delay, and the thread spun from the slubbing was not of the finest quality.

Figure 1:
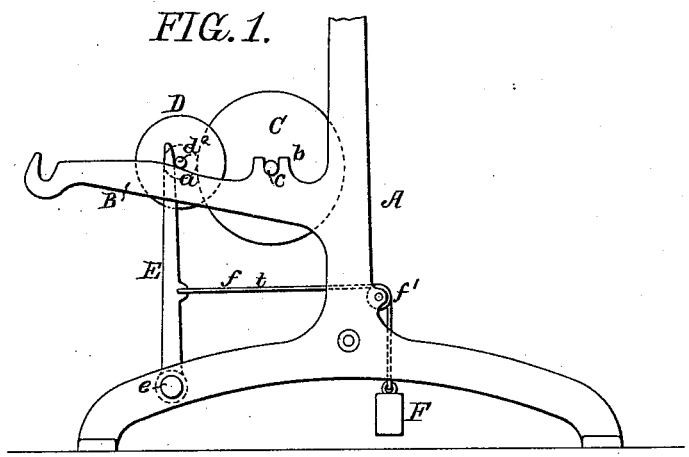
Figure 2:
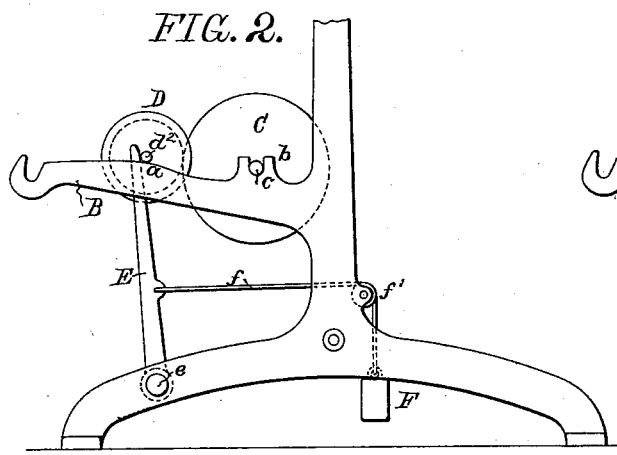
Figure 4:
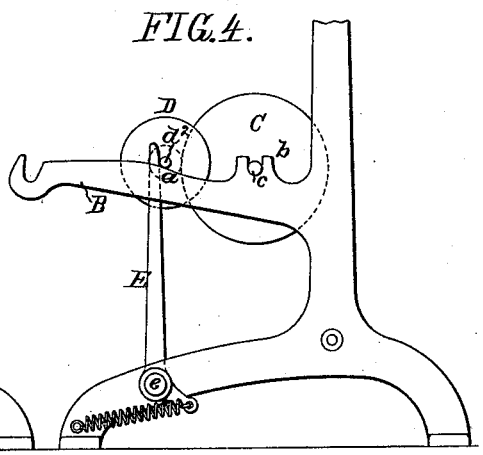
Figure 3:
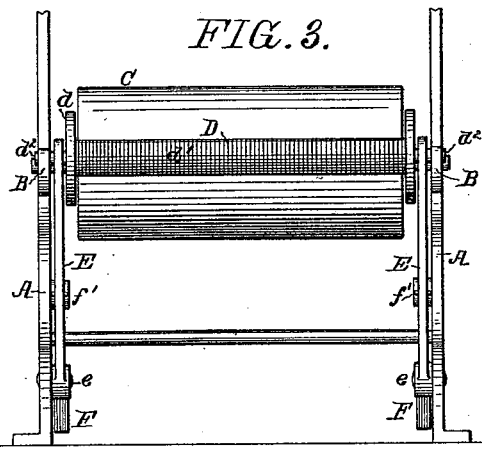

In the accompanying drawings:—Figures 1 and 2, are side views of a spool frame or creel adapted to be placed in front of a carding engine or spooling machine; I have simply shown the lower tier of spools, but it will be understood that two or more tiers may be used without departing from my invention. Fig. 3, is a front elevation of the lower part of the spool frame shown in Fig. 1, and Fig. 4, is a view of a modification of my invention.

A, A are the two side frames tied together in any suitable manner. Projecting from each frame are arms B, B, on which are supported the driving drum C and the spool D. The shaft $c$ of the driving drum is mounted in suitable bearings $b$ on the arms. The spool D has flanges $d$, and a bobbin portion $d'$ between the flanges, and projecting from each end of the spool is a journal $d^2$. These journals rest in the present instance on curved portions $a$ of the arms, although in some instances the arms may be perfectly straight.

The spool is supported by the arms, and is pressed against the drum C by two levers E, E in the present instance, hung to the side frames at $e$, and attached to each of these levers is a rope or cord $f$ which passes over a sheave $f'$, and suspended from this cord is a weight F. This weight may be made in sections so that it can be regulated to regulate the pressure of a spool upon the drum; one weight may be used where the two arms are connected.

A spring may be used in some instances in place of the weight without departing from my invention. The spring may be attached as shown in Fig. 4.

The object of curving the face $a$ of the arms on which the spools rest is to utilize part of the weight of the spool so that the lever pressure need not be so great. The arms are so curved that when the spool is small, and consequently light, the incline is greater; thus the spool is forced against the drum, but as the arm recedes from the drum the incline becomes less, and the greater proportion of the weight of the spool is sustained by the arm, the minor portion of the weight taken by the drum is about the same as the pressure taken by the drum when the spool is empty. In some instances, this curved surface alone may be used without the lever mechanism, the object being to only give pressure sufficient to turn the spool through the medium of the drum in order to wind the slubbing thereupon, or to unwind it from the spool.

I claim as my invention—

1. The combination of the drum, support therefor, a spool adapted to rest against the drum and to be turned thereby, and an eccentrically curved bearing surface for the spool, the incline of said bearing surface being greater as it nears the drum, substantially as specified.

2. In a spool support the frame having substantially horizontally extending arms, a drum mounted in fixed bearings on said frame, with a spool having journals by which it is suspended between the arms, whereby the arms take the major portion of the weight of the spool, with means for pressing the spool against the drum so that the pressure will be uniform, substantially as described and for the purpose specified.

3. The combination of the frame, the driving drum adapted to bearings thereon, horizontal arms projecting from the side of said frame, a journaled spool supported by said arms at the side of the drum, pivoted levers bearing against the journals of the spool and weights secured to the levers, substantially as described.

In testimony whereof I have signed my name to this specification in the presence of two subscribing witnesses.

THOMAS C. DILL.

Witnesses:
WILLIAM D. CONNER,
JOSEPH H. KLEIN.